United States Patent
Kanzaki et al.

(10) Patent No.: US 8,502,505 B2
(45) Date of Patent: Aug. 6, 2013

(54) BATTERY DRIVING DEVICE, LOAD CONTROL METHOD, INTEGRATED CIRCUIT AND LOAD CONTROL PROGRAM

(75) Inventors: Hideyuki Kanzaki, Hyogo (JP); Masayoshi Tojima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 421 days.

(21) Appl. No.: 12/302,559

(22) PCT Filed: May 29, 2007

(86) PCT No.: PCT/JP2007/060892
§ 371 (c)(1),
(2), (4) Date: Nov. 26, 2008

(87) PCT Pub. No.: WO2007/139102
PCT Pub. Date: Dec. 6, 2007

(65) Prior Publication Data
US 2009/0237033 A1    Sep. 24, 2009

(30) Foreign Application Priority Data
May 30, 2006  (JP) .................................. 2006-149188

(51) Int. Cl.
*H02J 7/00* (2006.01)
(52) U.S. Cl.
USPC .......................................... 320/135; 320/136
(58) Field of Classification Search
USPC ....................................................... 320/135
See application file for complete search history.

(56) References Cited

U.S. PATENT DOCUMENTS

| 5,166,623 | A | | 11/1992 | Ganio | |
|---|---|---|---|---|---|
| 5,278,509 | A | | 1/1994 | Haynes et al. | |
| 5,656,876 | A | * | 8/1997 | Radley et al. | 320/135 |
| 6,157,169 | A | * | 12/2000 | Lee | 320/132 |
| 6,236,214 | B1 | * | 5/2001 | Camp et al. | 324/427 |
| 6,710,578 | B1 | * | 3/2004 | Sklovsky | 320/127 |
| 2004/0014489 | A1 | * | 1/2004 | Miyachi et al. | 455/550.1 |

FOREIGN PATENT DOCUMENTS

| JP | 6-27207 | 2/1994 |
|---|---|---|
| JP | 2000-253142 | 9/2000 |
| JP | 2004-72212 | 3/2004 |

OTHER PUBLICATIONS

Matsuda et al. "Battery Guidebook", Maruzen Co., Ltd. (2001). (with partial English translation, pp. 247-248 and 254).
International Search Report issued Jul. 3, 2007 in the International (PCT) Application of which the present application is the U.S. National Stage.

* cited by examiner

*Primary Examiner* — Drew A Dunn
*Assistant Examiner* — Robert Grant
(74) *Attorney, Agent, or Firm* — Wenderoth, Lind & Ponack, L.L.P.

(57) ABSTRACT

A battery-driven device extends an operating time of a battery (a secondary battery). A battery control unit included in the battery drive-device stores therein one or more voltage thresholds, and detects a sharp voltage drop that occurs immediately after the start of discharging of a battery that is fully charged, based on the current and voltage of the battery and the stored voltage thresholds. Upon detecting a sharp voltage drop, the battery control unit decreases power consumption of the battery.

7 Claims, 13 Drawing Sheets

BATTERY DRIVING DEVICE, LOAD CONTROL METHOD, INTEGRATED CIRCUIT AND LOAD CONTROL PROGRAM

BACKGROUND OF THE INVENTION

1. Technical Field

The present invention relates to prolongation of operating time of a secondary battery (hereinafter simply referred to as "battery"). More particularly, the present invention relates to prolongation of the battery operating time with an eye on voltage drop that occurs immediately after charging.

2. Background Art

Currently, various devices such as mobile phones, laptop computers, portable video game players and digital cameras are equipped with batteries. These devices are provided with a variety of applications such as audio player and video player. In order to use such applications for a long time, the batteries that can be used for a longer period of time are demanded.

To meet such demands, many techniques to detect voltage drop caused by power consumption and reduce the load on the batteries are disclosed. For example, the following patent document 1 discloses a technique to reduce power consumption and delay the end of discharging by decreasing the brightness of an LTD or extending a low brightness period while LTD is blinking, if the voltage falls below a certain threshold level in the course of monitoring of the voltage.

Patent document 1: Japanese Laid-open Patent Application Publication No. 2004-72212

Nonpatent document 1: Denchi Binran ("Battery Handbook") compiled by Yoshiharu Matsuda and Zen-ichiro Takehara, Maruzen Co., Ltd Issued on Aug. 20, 1990

However, there is a demand for a new technique that enables batteries to operate longer. Therefore, the present invention aims to provide a battery-driven device, a load control method, an integrated circuit and a load control program that enable a battery to operate for a prolonged period of time.

SUMMARY OF THE INVENTION

In order to solve the above problem, the present invention provides a battery-driven device that is driven by a chargeable battery, comprising: a storage unit operable to store therein one or more voltage thresholds in one-to-one association with one or more operations to be executed by the battery-driven device, each voltage threshold representing a voltage from which a voltage drop of the battery fully charged becomes moderate during execution of one of the operations associated therewith; a voltage measuring unit operable to measure a voltage of the battery; a specifying unit operable to specify one of the operations that is being executed by the battery-driven device; an acquisition unit operable to acquire one of the voltage thresholds that corresponds to the specified operation from the storage unit; a voltage comparison unit operable to compare the acquired voltage threshold with the measured voltage; and a control unit operable to control power consumption of the battery to decrease if the measured voltage is equal to or more than the acquired voltage threshold.

Here, the function of the above "storage unit" is carried out by a voltage threshold storage unit 224 of the embodiment 1. The function of the "voltage measuring unit" is carried out by a voltmeter 208 of the embodiment 1. The function of the "specifying unit" is carried out by a system controller 221. The functions of the "acquisition unit" and the "comparison unit" are carried out by a voltage comparison unit 223. The function of the "control unit" is carried out by a load control unit 227 of the embodiment 1.

According to the above structure, when the battery is in the early stage of use and a voltage drop having a gradient greater than a prescribed gradient is occurring, the battery-driven device controls power consumption of the battery to decrease. The prescribed gradient corresponds to a load amount on the battery, and the load amount is determined by an operation that the battery driven device executes. By controlling power consumption of the battery to decrease at the early stage of use, the battery can be used for a prolonged period of time. The definition of "the early stage of use" is explained in the following embodiments with reference to a graph.

The battery-driven device may further comprise a reception unit operable to receive the one or more voltage thresholds inputted by a user, wherein the storage unit may store therein the one or more voltage thresholds received by the reception unit.

According to this structure, the battery-driven device of the present invention receives the thresholds inputted by the reception unit.

The voltage threshold varies depending on the type of a battery. Since the battery-driven device of the present invention is equipped with the reception unit, a suitable voltage threshold can be received even when more precise voltage threshold is turned out after the battery is sold, or when a user changes the battery to another. It is also possible, if a user adds a new application, to add a voltage threshold that corresponds to the load to be generated when the application is executed.

The battery-driven device may further comprise: a temperature threshold storage unit operable to store therein a prescribed temperature threshold; a temperature measuring unit operable to measure a temperature of the battery; and a temperature comparison unit operable to compare the temperature threshold with the measured temperature, wherein the control unit may further control power consumption of the battery to decrease if a comparison result by the temperature comparison unit indicates the measured temperature is lower than the temperature threshold, regardless of a comparison result by the voltage comparison unit.

Here, the function of the above "temperature threshold storage unit" is carried out by a temperature threshold storage unit 429 of the embodiment 3. The functions of the "temperature measuring unit" and the "temperature comparison unit" are carried out by a thermometer 410 and a temperature comparison unit 430 respectively.

Discharge rate characteristic becomes poorer as the temperature decreases, which is explained later with a graph. Reduction of power consumption of the battery is the only conceivable way to deal with this phenomenon. According to this structure, the battery can operate for a prolonged period of time even under a low temperature, because the battery-driven device is equipped with the temperature measuring unit and temperature comparison unit, and the control unit operates to reduce power consumption of the battery when the measured temperature is lower than the prescribed threshold, regardless of a comparison result by the voltage comparison unit.

The storage unit may further store therein a termination voltage threshold that represents a voltage from which a voltage drop of the battery becomes sharp when the battery has been continuously used, the battery-driven device may further comprise a termination judgment unit operable to compare the voltage measured by the voltage measuring unit with the termination voltage threshold, and the control unit may control power consumption of the battery to decrease if the measured voltage is lower than the termination voltage threshold, regardless of a comparison result by the voltage comparison unit.

The function of the above "termination judgment unit" is carried out by a termination judgment unit 267 of the embodiment 2.

The battery voltage decreases as the battery operation time becomes longer. In particular, when the discharged electric amount approaches the nominal capacity, the voltage drops more sharply. Under such condition, reduction of power consumption of the battery is the only conceivable way to prolong the battery operation time. According to the structure of the present invention, when the termination judgment unit judges that the voltage of the battery is lower than the termination voltage, the control unit always operates to reduce power consumption of the battery. As a result, it is possible to prolong the operation time of the battery. The definition of the "termination stage" is explained with a graph in the following embodiments.

The present invention also provides a battery-driven device that is driven by a chargeable battery, comprising: a storage unit operable to store therein a prescribed threshold; a voltage measuring unit operable to periodically measure a voltage of the battery; a calculation unit operable to calculate a temporal variation in voltage of the battery based on the measured voltage; a comparison unit operable to compare the calculated variation with the threshold; and a control unit operable to control power consumption of the battery to decrease if the calculated variation is less than the threshold.

According to this structure, the judgment unit acquires the voltage of the battery periodically, and based on a voltage variation the judgment unit judges whether it is necessary to control power consumption of the battery to decrease. Because of this structure, the present invention can address both of the sharp voltage drops that occur at the early stage of use when the fully charged battery is started to be used, and that occur at the termination stage of use of the battery.

Figure 1:
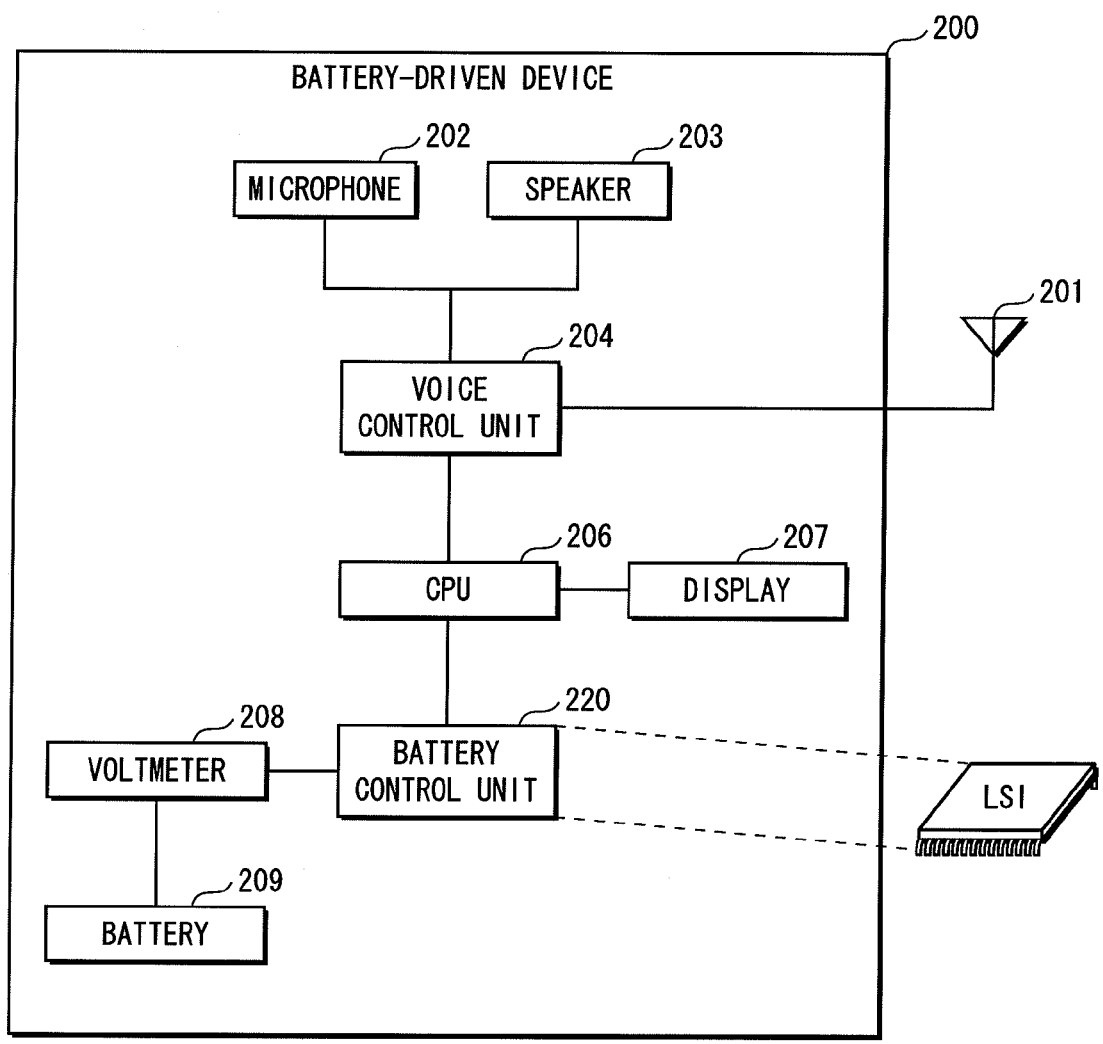
FIG. 1 is a diagram showing the structure of a battery-driven device 200 pertaining to the embodiment 1 and a data flow among components thereof.

DESCRIPTION OF THE CHARACTERS 201 antenna
202 microphone
203 speaker
204 voice control unit
206 CPU
207 display
208 voltmeter
209 battery
220 battery control unit
221 system controller
223 voltage comparison unit
224 voltage threshold storage unit
225 voltage threshold
226 selector
227 load control unit

DETAILED DESCRIPTION OF THE INVENTION

1. Embodiment 1

The battery-driven device of the present invention is described below with reference to the drawings. Although "the battery-driven device" here may represent various kinds of devices such as a mobile phone, a portable video game player, a digital camera, and a laptop computer, a mobile phone is taken as an example in this embodiment.

1.1 Characteristic of a Battery

For easy understanding of the present invention, discharge rate characteristic of a general battery is explained with reference to FIGS. 12 and 13.

A battery of nominal voltage 3.6 V and nominal capacity 810 mAh is taken as an example here. The battery is assumed to be fully charged at the start of use.

Figure 12:
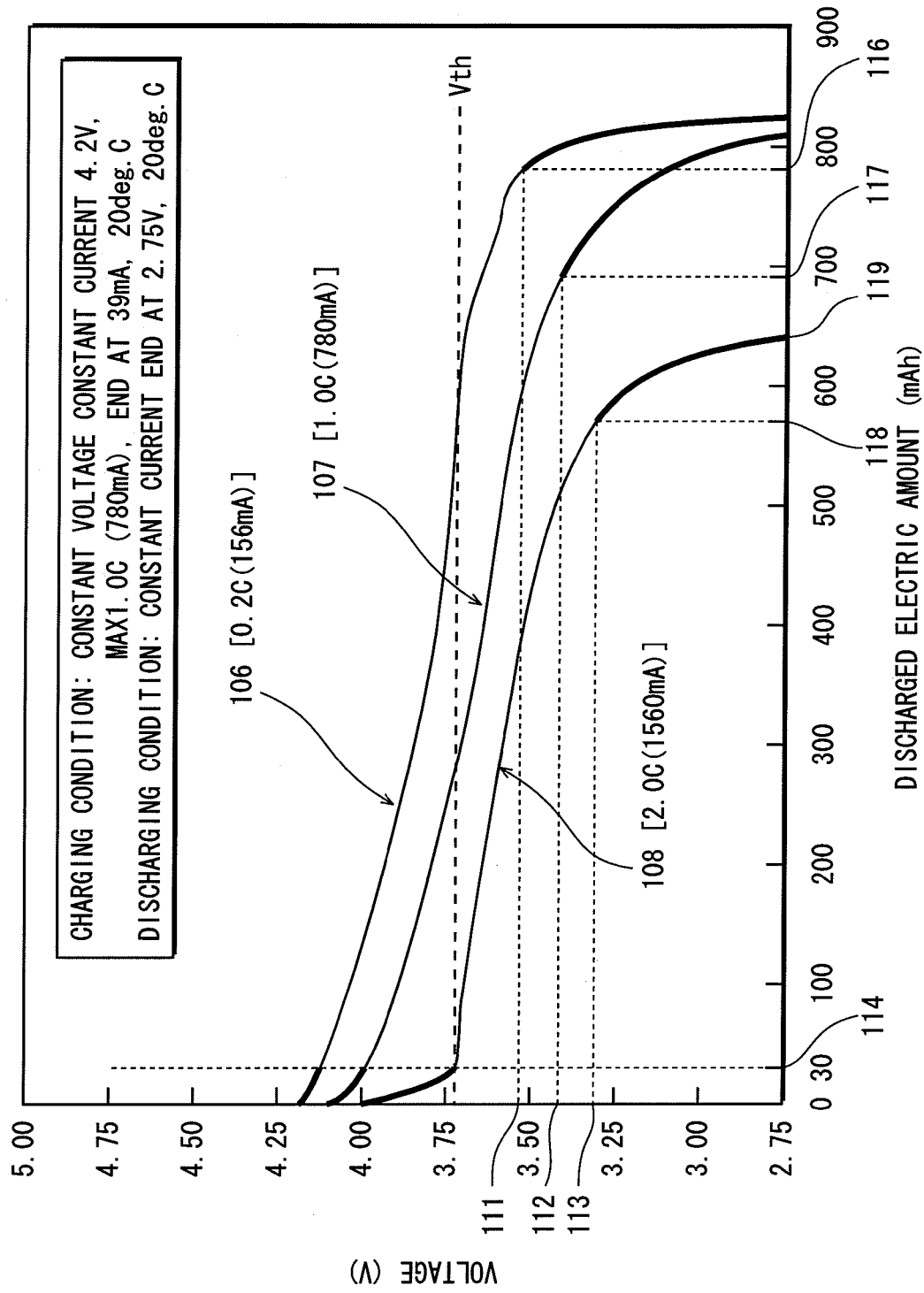
FIG. 12 is a graph showing the relationship between a discharged electric amount and a battery voltage when the battery is used under different load conditions.

FIG. 12 is a graph showing the discharge rate characteristic of the battery used under three different load conditions.

A curve 106 indicates the discharge rate characteristic of the battery used under the load of 0.2 C (156 mA), a curve 107 indicates that of the battery used under the load of 1.0 C (780 mA) and a curve 108 indicates that of the battery used under the load of 2.0 C (1560 mA).

Each curve shows a sharp voltage drop immediately after the start of discharging. More particularly, the voltage drop is sharper as the load on the battery is greater. The stage in which the voltage sharply drops immediately after the start of discharging of the battery fully charged is referred to as "the early stage of use" in this Specification.

After discharging a certain amount of electricity (e.g. discharged electric amount 114 (approximately 30 mAh)), the battery continues to discharge electricity at an almost constant voltage, (here approximately at 3.6 V), regardless of the load level. The stage in which the battery maintains the constant voltage is referred to as "the stability stage" in this Specification.

The curve 106 shows a sharp voltage drop when an electric amount 116 has been discharged and the voltage of the battery comes below a voltage 111. The curve 107 shows a sharp voltage drop when an electric amount 117 has been discharged and voltage comes below a voltage 112. The curve 108 shows a sharp voltage drop when an electric amount 118 has been discharged and voltage comes below a voltage 113. The stage in which such a sharp voltage drop is occurring, indicated in bold in FIG. 12, is referred to as "the termination stage" in this Specification.

When the battery is used under the light load condition as the curve 106 indicates, the battery can discharge the electricity of almost the nominal capacity, i.e. 810 mAh. Meanwhile when the battery is used under the heavy load condition as the curve 108 indicates, the battery can only discharge the electricity of around the discharged electric amount 119, i.e. 640 mAh.

That is to say, when the battery is used under the heavy load condition, the voltage drop occurs before the electric discharge reaches the nominal capacity of 810 mAh, and only around 70% electricity of the nominal capacity can be discharged from the battery.

Figure 13:
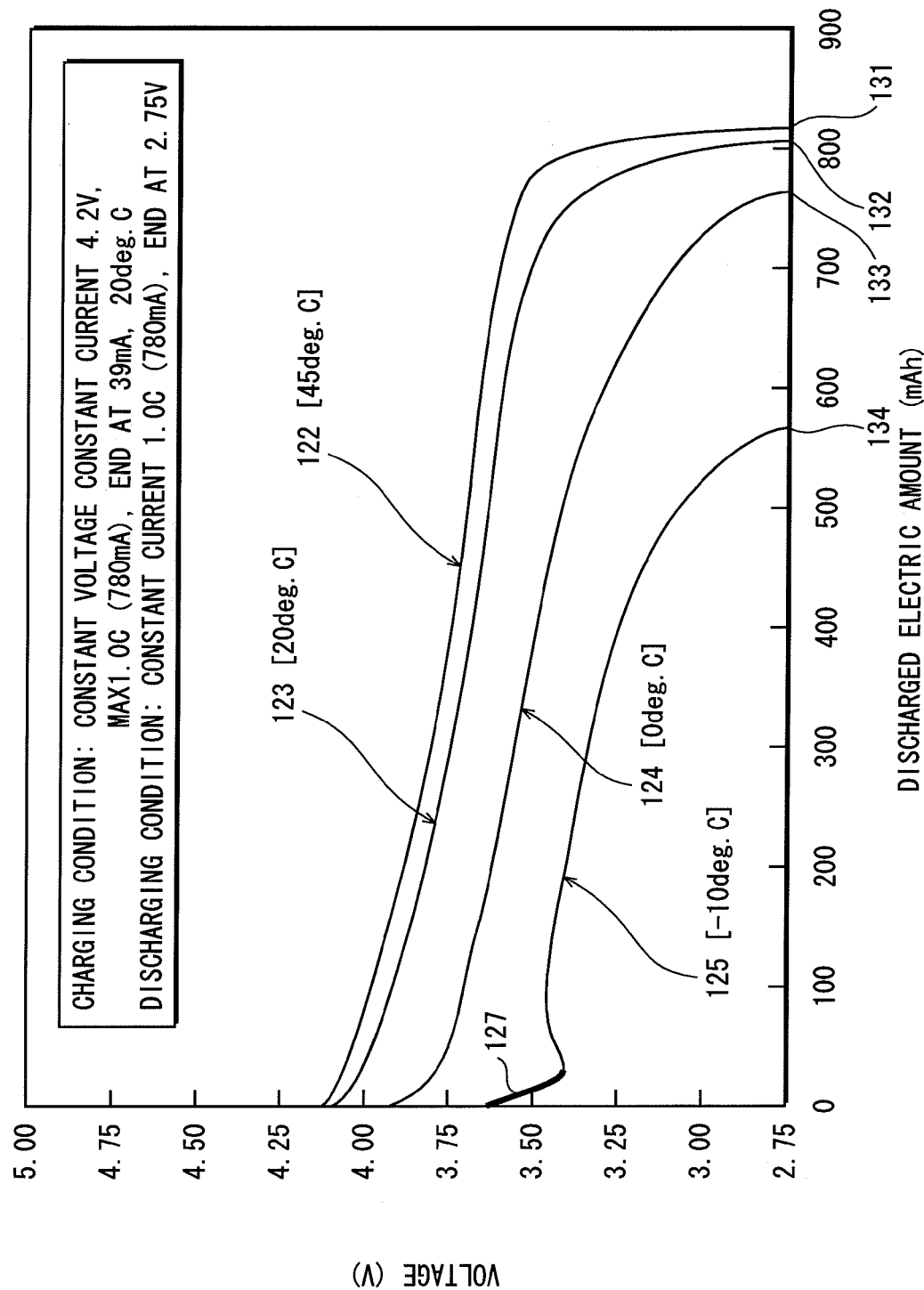
FIG. 13 is a graph showing the relationship between a discharged electric amount and a battery voltage when the battery is used under different temperature conditions.

FIG. 13 is a graph showing the discharge rate characteristic at different temperatures, of the same battery as above. The battery used under the load condition of 1.0 C (780 mA) is taken as an example here.

Curves 122, 123, 124 and 125 show the discharge rate characteristic of the battery used under the temperature of 45 degC, 20 degC, 0 degC, and −10 degC respectively. As mentioned above, the voltage sharply drops immediately after the start of discharging. Here an even sharper voltage drop is observed under the low temperature as the bold part 127 of the curve 125 indicates.

The curve 122 shows that the battery discharges the electricity of the discharged electric amount 131 under 45 degC. The curve 123 shows the battery discharges the electricity of the discharged electric amount 132 under 20 degC. The curve 124 shows the battery discharges the electricity of the discharged electric amount 133 under 0 degC. The curve 125 shows the battery discharges the electricity of the discharged electric amount 134 under −10 degC.

As the above four curves indicate, the discharge rate characteristic of the battery becomes poorer as the temperature decreases, and the total electricity discharged is reduced.

The characteristic of a secondary battery is disclosed in detail in the nonpatent document 1, for instance.

1.2 Outline of the Battery-Driven Device 200

The battery-driven device 200 is a mobile phone including an antenna 201, a microphone 202, a speaker 203, a voice control unit 204, a CPU 206, a display 207, a battery control unit 220, a voltmeter 208 and a battery 209.

The voltmeter 208 constantly measures the voltage of the battery 209, and outputs a measured voltage V to the battery control unit 220. The battery control unit 220 then compares the voltage V received from the voltmeter 208 with a prescribed threshold Vth. If the result of the comparison is $V \geq Vth$, the battery control unit operates to reduce the load on the battery.

The battery-driven device 200 is a computer system including a recording medium such as a RAM and a ROM, not illustrated, and a microprocessor, and the RAM or the ROM stores a computer program. The battery-driven device 200 accomplishes a part of its function by the microprocessor operating according to the above computer program.

1.3 Structure of the Battery-Driven Device 200

Each component of the battery-driven device 200 is described bellow. Since a voice communication function of the battery-driven device 200 as a mobile phone is widely known and is not directly related to the present invention, descriptions about the antenna 201, the microphone 202, the speaker 203, the voice control unit 204, and the display 207 are omitted.

(1) Battery 209

The battery 209 is a commonly used secondary battery such as a lead storage battery, a nickel-cadmium storage battery, a nickel-hydrogen battery and a lithium battery. The battery 209 provides electricity to each component of the battery-driven device 200.

(2) Voltmeter 208

The voltmeter 208 measures the voltage provided by the battery 209, and outputs the measured value (voltage V) to the battery control unit 220.

(3) Battery Control Unit 220

Figure 2:
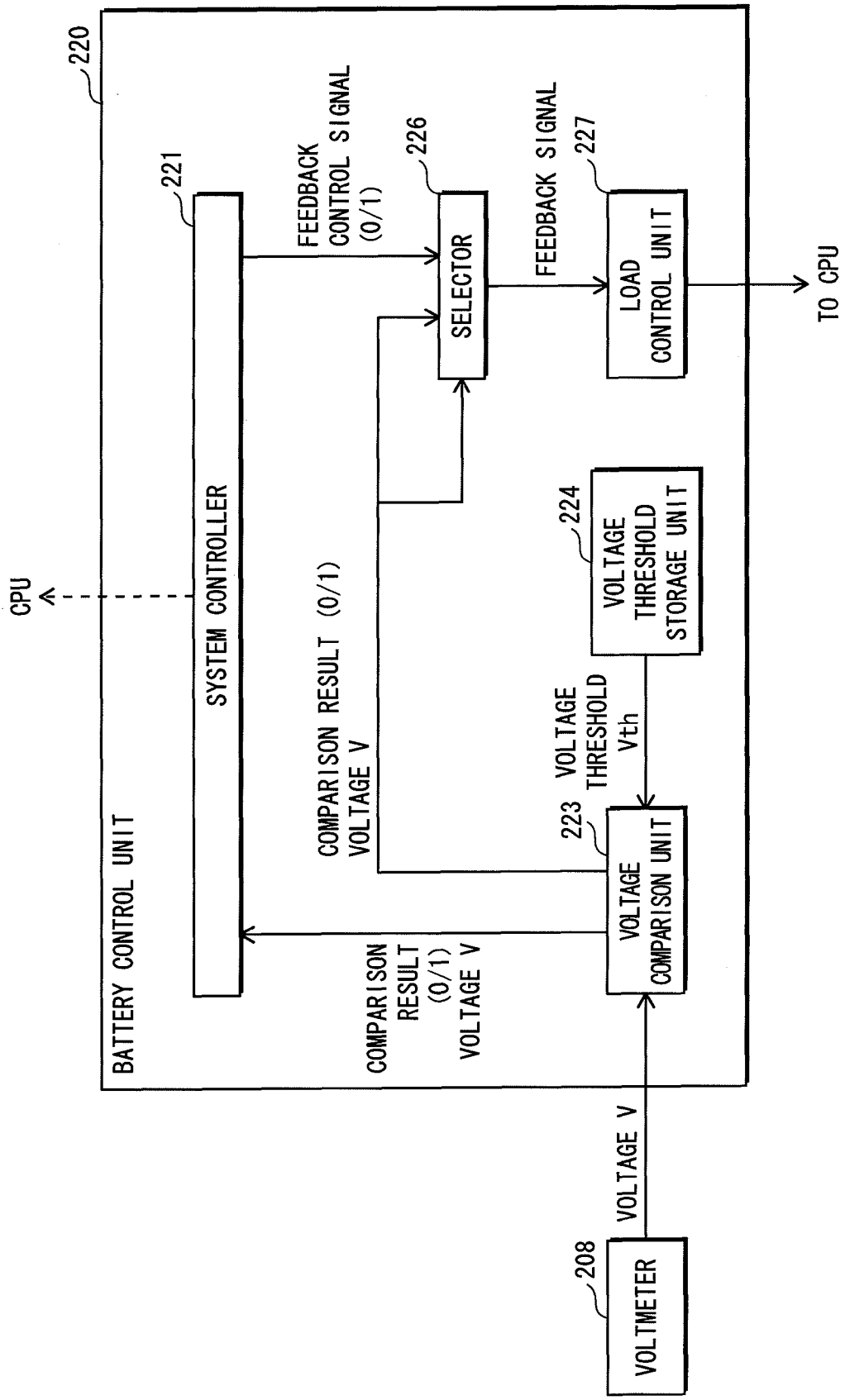
FIG. 2 is a diagram showing the structure of a battery control unit 220 that is the characteristic component of the embodiment 1.

FIG. 2 is a block diagram showing the detailed structure of the battery control unit 220. As FIG. 2 shows, the battery control unit 220 includes a system controller 221, a voltage comparison unit 223, a voltage threshold storage unit 224, a selector 226 and a load control unit 227. These components are formed on a single LSI as FIG. 1 indicates.

(3-1) Voltage Threshold Storage Unit 224

The voltage threshold storage unit includes a ROM, for example, and stores therein the voltage threshold Vth. This can be other type of nonvolatile recording medium such as a flash memory.

As mentioned above, the voltage of the battery 209 that is fully charged drops sharply immediately after the start of discharging, and after discharging a certain amount of electricity, the voltage becomes almost constant. The voltage of this inflection point is referred to as the voltage threshold Vth. When the battery is actually mounted, $Vth=Vth\pm\alpha$ taking into consideration individual differences or variations during manufacturing. Since the load on the battery varies depending on an application being executed by the CPU 206, the voltage at the inflection point, at which the early stage of use ends, differs according to the application. By way of example, in this embodiment the voltage threshold Vth is defined as the voltage at which the early stage of use ends in the case where the CPU 206 is executing the application with the heaviest load. Alternatively, the voltage at the inflection point may be measured for each of the applications during the execution thereof, and the average of the measured voltages may be used as the voltage threshold Vth.

(3-2) Voltage Comparison Unit 223

The voltage comparison unit 223 receives the voltage V of the battery 209 from the voltmeter 208. Upon receiving the voltage V, the voltage comparison unit 223 compares the received voltage V with the voltage threshold Vth stored in the voltage threshold storage unit 224, and outputs the comparison result to the system controller 221 and to the selector 226. The comparison result is, for example, 1-bit data in conformity with the positive logic, and more specifically "1" is outputted when $V \geq Vth$ or "0" when $V<Vth$. $V \geq Vth$ indicates the battery 209 is estimated to be in the early stage of use, and $V<Vth$ indicates the battery 209 is likely in the stability stage.

Together with the result of the comparison, the voltage comparison unit 223 also outputs the voltage V received from the voltmeter 208 to the system controller 221 and to the selector 226.

The voltage comparison unit 223 may constantly carry out the above comparison and transmission, or may periodically repeat the above comparison and transmission.

(3-3) System Controller 221

The system controller 221 stores therein the information of the applications held in the CPU 206, associating the information of each application with the inflection point voltage while the application is being executed. The inflection point is the point from which the voltage drop of the fully charged battery becomes moderate.

Figure 3:
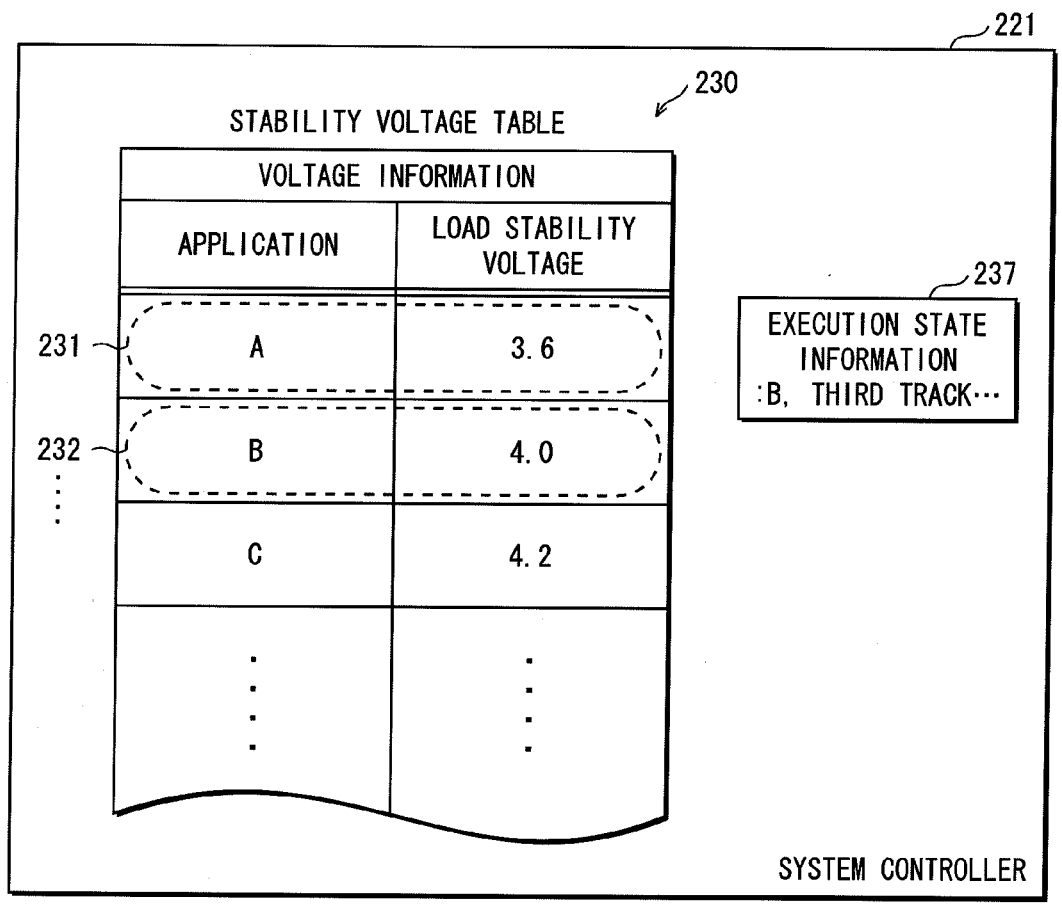
FIG. 3 shows an example of information stored in a system controller 221.

For example, the system controller 221 stores therein a table shown in FIG. 3. FIG. 3 shows an example of the information that the system controller 221 manages.

As is seen in the FIG. 3, a stability voltage table 230 includes a plurality of pieces of voltage information 231, 232 . . . , and each piece of voltage information corresponds one-to-one with the application held in the CPU 206.

Each piece of voltage information contains an identifier to identify the corresponding application and a load stability voltage.

The load stability voltage is the voltage of the inflection point where the state of the battery changes from the early stage of use to the stability stage, while the CPU is executing the corresponding application, and its measuring unit is V (volt).

The system controller 221 also monitors operations of the CPU 206 and stores, and periodically updates, the identifier and the state of the application that the CPU is executing as an execution state information 237.

The system controller 221 receives 1-bit comparison result and the voltage V from the voltage comparison unit 223.

If the received result is "0", the system controller does not perform anything particular.

If the received result is "1", the system controller 221 specifies the piece of voltage information corresponding to the application currently being executed by CPU 206 based on the execution state information 237. Subsequently the system controller 221 reads out the load stability voltage from the piece of voltage information, and compares the load stability voltage with the received voltage V.

If the load stability voltage≦the voltage V, it is likely that the voltage of the battery 209 is still in the early stage of use. The system controller 221 then generates a 1-bit feedback control signal indicating that power-saving control is necessary, and outputs the feedback control signal to the selector 226. The positive logic is applied to the feedback control signal here, so "1" shows power-saving control is necessary and "0" shows power-saving control is unnecessary.

If the load stability voltage>the voltage V, it is likely that the battery 209 is already in the stability stage. The system controller 221 then generates the feedback control signal "0" indicating that power-saving control is unnecessary, and outputs the feedback control signal "0" to the selector 226.

Here the operations of the system controller 221 are specifically explained on the assumption that the battery-driven device 200 is executing a music player application.

Specific Example (a)

The above-mentioned music player application corresponds to the voltage information 232. The voltage threshold is assumed to be Vth=3.7. The execution state information 237 includes information such as an identifier "B" of the currently executing application, a currently playing track "the third track" and remaining playing time of the mentioned track "30 seconds".

Here the system controller 221 is assumed to receive the comparison result "1" and the voltage V=4.2 from the voltage comparison unit 223.

Since the comparison result is "1", the system controller 221 specifies the voltage information 232 from the stability voltage table 230 based on the execution state information 237, and compares the load stability voltage "4" contained in the voltage information with the received voltage "4.2". Since the comparison result shows that the received voltage "4.2" is larger than the load stability voltage "4.0", the system controller 221 generates 1-bit feedback control signal "1" indicating that the power-saving control is necessary.

Subsequently, the system controller 221 outputs the feedback control signal "1" to the selector 226.—This concludes the specific example (a).

Specific Example (b)

The assumption here is that the system controller 221 receives the comparison result "1" and the voltage V=3.9 from the voltage comparison unit 223 while the CPU 206 is executing the same application as above.

Here again, the system controller 221 specifies the voltage information 232 based on the execution state information 237, and reads out the load stability voltage "4.0" from the voltage information 232. The system controller 221 then compares the load stability voltage "4.0" with the received voltage "3.9". Since the comparison result shows the received voltage is lower than the load stability voltage, the system controller 221 generates the feedback control signal "0" indicating that the power-saving control is unnecessary, and outputs the feedback control signal "0" to the selector 226.—this concludes the specific example (b).

Note that the feedback control signal may include information other than the data showing the necessity of the power-saving control. For example, the execution state information showing the CPU condition or information of the specific power-saving control may be included.

(3-4) Selector 226

The selector 226 is a functional unit that selects one signal between the signal outputted from the system controller 221 and the signal outputted from the voltage comparison unit 223, based on a comparison results of the voltage comparison unit 223 as the selecting condition, and outputs the selected signal to the load control unit 227. The selector 226 is explained in detail below.

As indicated in FIG. 2, the selector 226 receives a result of the comparison that has been made between the voltage V of the battery and the voltage threshold Vth, from the voltage comparison unit 223. Together with the comparison result, the selector 226 receives voltage V.

The selector 226 also receives the feedback control signal from the system controller 221.

If the comparison result received from the voltage comparison unit 223 is "0", the selector 226 outputs the received "0" to the load control unit 227 as a feedback signal. Hereafter the signal to be outputted from the selector 226 to the load control unit 227 is referred to as "the feedback signal".

If the comparison result received from the voltage comparison unit 223 is "1", the selector 226 outputs the feedback control signal received from the system controller 221 to the load control unit 227 as the feedback signal.

(3-5) Load control unit 227

The load control unit 227 stores therein the identifiers of the applications held in the CPU 206, associating each identifier with a piece of information of the power-saving control to be performed when it is required while the corresponding application is being executed. The load control unit 227, for example, stores a table shown in FIG. 4.

Figure 4:
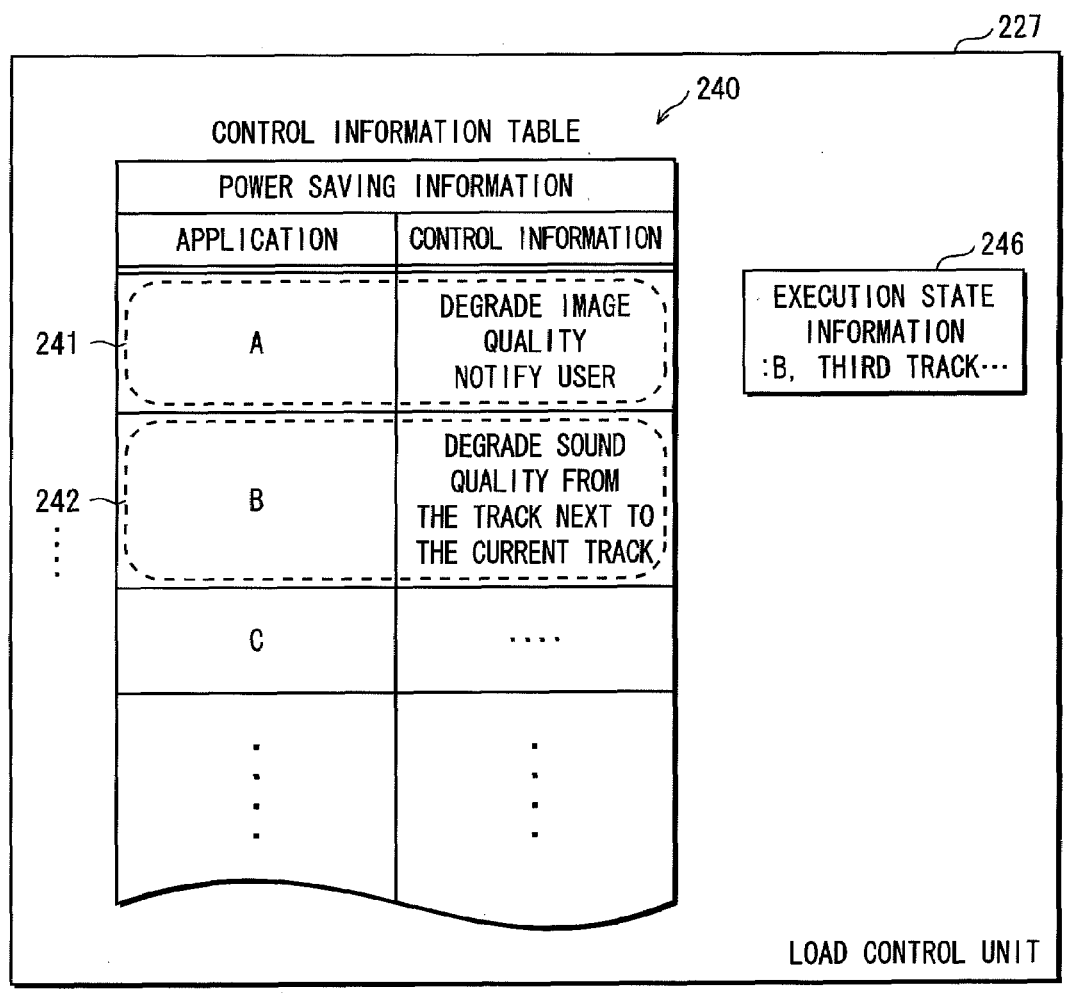
FIG. 4 shows an example of information stored in a load control unit 227.

FIG. 4 shows an example of the information stored by the load control unit 227. The load control unit 227 stores therein a control information table 240 and an execution state information 246, as indicated in the FIG. 4.

The control information table 240 includes a plurality of pieces of power-saving information 241, 242 . . . and each piece of power-saving information corresponds one-to-one with the applications that the CPU 206 executes.

Each piece of power-saving information contains an identifier to identify the corresponding application and the information of the specific power-saving control for the CPU 260 and so on to be performed when it is required while the application is being executed. For example, the power-saving information 241 corresponds to a video recorder/player application. The power-saving information 241 contains the identifier "A" of this application and the control information to "degrade image quality, notify user". These information indicates that when the power-saving control is required while the video recorder/player application is executing, an instruction is given to the CPU 206 to degrade the image to be recorded or played, and to notify a user of degrading by a method such as showing a message "the quality of the playing/recording image will be degraded for power saving" on a display for a certain period of time.

The power-saving information 242 corresponds to a music player application, and contains the identifier "B" of this application and the control information to "degrade sound quality from the track next to the current track". These information indicates that when the power-saving control is required while the music player application is executing, the instruction is given to the CPU 206 to maintain the normal sound quality until the end of the track currently being played, and degrade the sound quality from the next track.

The load control unit 227 stores therein the execution state information 246 that shows the operation state of the CPU 206. The execution state information 246 contains the information such as the identifier and the execution state of the application that the CPU 206 is executing. The load control unit 227 constantly monitors operations of the CPU 206, and updates the execution state information every time the operating state changes. Note that although it is described here that the load control unit 227 itself monitors the CPU 206, the load control unit 227 may receive, from the system controller 221, the execution state information 237 that shows the operating state of the CPU 206.

The load control unit 227 receives the feedback signal from the selector 226. The feedback signal to be received by the load control unit 227 is 1-bit data ("0" or "1"), indicating the necessity of power-saving control.

The load control unit 227 analyzes the received feedback signal. If the analysis result shows the received feedback signal is "0", the load control unit 227 instructs the CPU 206 to normally execute the application.

If the analysis result shows the received feedback signal is "1", the load control unit 227 specifies which piece of power-saving information in the control information table 240 corresponds to the execution state information 246 stored in the load control unit 227. Based on the specified power-saving information and the stored execution state information 246, the load control unit 227 then instructs the CPU 206 to save power consumption.

In the case of the above specific examples (a) and (b), the execution state information 246 contains the information such as the identifier "B" of the application that the CPU 260 is executing, "the third track" that is being played and "30 seconds remaining". In the case of the specific example (a), the load control unit 227 receives the feedback signal "1" and reads out the stored execution state information 246. Based on the read out execution state information, the load control unit 227 specifies the power-saving information 242 that corresponds to the application being executed by the CPU 206, and reads out the control information in the specified power-saving information.

Based on the read out control information and the execution state information 246, the load control unit 227 instructs the CPU 206, after standing by for 30 seconds, to degrade the sound quality. In the case of the specific example (b), the load control unit 227 receives the feedback signal "0". As the received signal is "0", the load control unit 227 instructs the CPU 206 to normally execute the application.

(4) CPU 206

The CPU 206 is a computer system that includes a microprocessor, a RAM and a ROM. The RAM and the ROM store various application programs. As the microprocessor operates in accordance with these application programs, a user can utilize a variety of functions. These applications can be, for example, a music player, a video recorder/player, or photograph taking/displaying/editing application.

Following the operations from the user, the CPU 206 starts up these applications and provides various functions.

While executing these applications, the CPU 206 receives the instruction from the load control unit 227 in the battery control unit 220. The instruction is either to perform the power-saving control that corresponds to the executing application, or to normally execute the application.

Upon receiving the instruction of the power-saving control, the CPU 206 changes a part of operations to be performed by the application in accordance with the given instruction.

Upon receiving the instruction of the normal execution of the application, the CPU 206 executes the application as it is coded in the application program the CPU 206 stores.

(5) Operations of the Battery Control Unit

Figure 5:
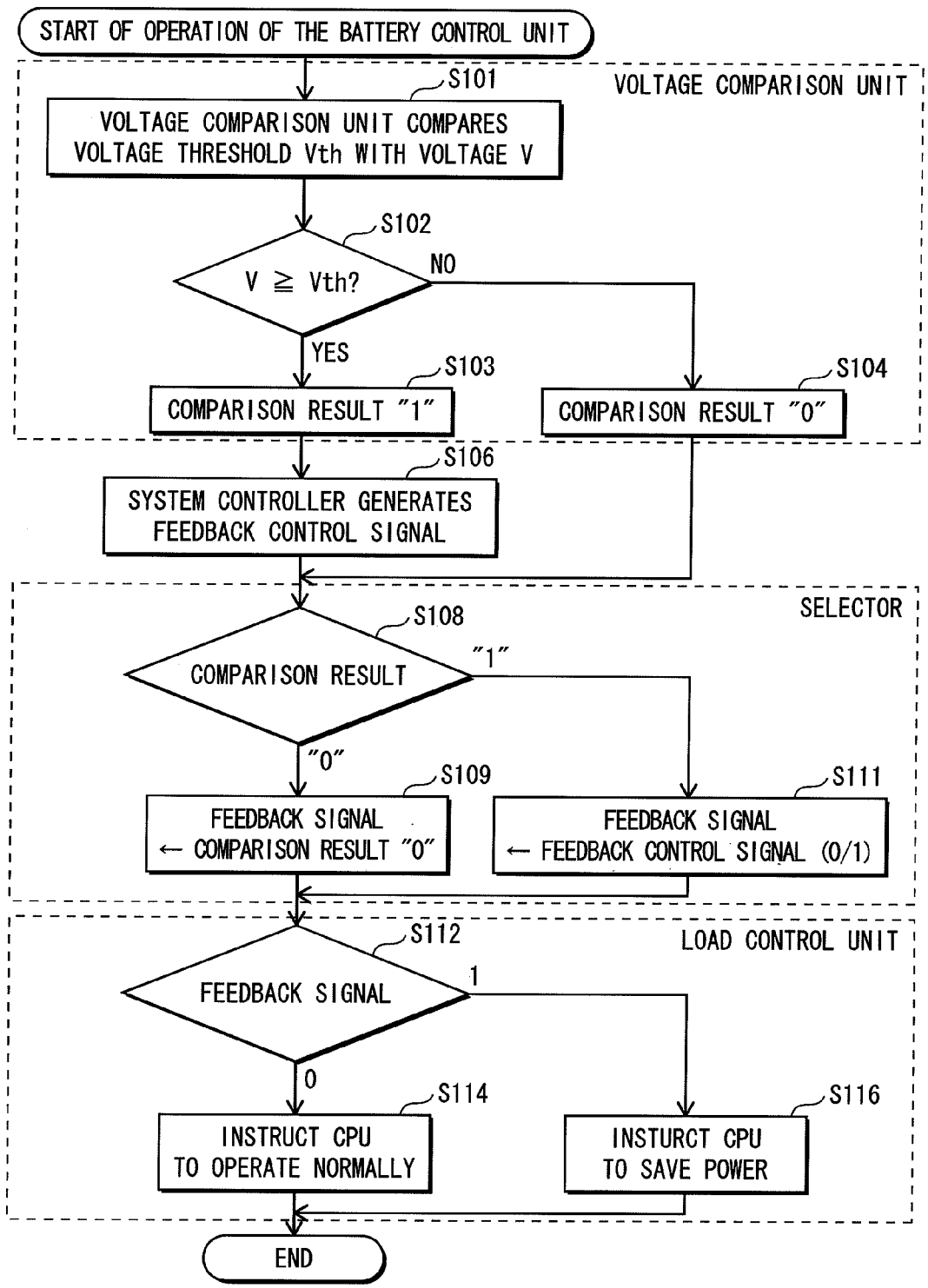
FIG. 5 is a flow chart showing operations of the battery control unit 220.

The operations of the battery control unit 220 which is the characteristic component of the embodiment 1 are described below with reference to the flow chart of FIG. 5.

The voltage comparison unit 223 compares the voltage V measured by the voltmeter 208 with the voltage threshold Vth stored in the voltage threshold storage unit 224 (step S101). If the comparison result is V≧Vth (YES of step S102), the voltage comparison unit 223 generates the comparison result "1" and outputs the generated "1" and the voltage V (step S103).

If the comparison result is V<Vth (NO of step S102), the voltage comparison unit 223 generates the comparison result "0" and outputs the generated "0" and the voltage V (step S104).

If the system controller 221 receives the comparison result "1" and the voltage V from the voltage comparison unit 223, the system controller 221 generates the feedback control signal (step S106) based on the current execution state of the CPU 206 and the stability voltage table 230, and outputs the signal to the selector 226.

The selector 226 receives the comparison result and the voltage V from the voltage comparison unit 223. If the received comparison result is "0", ("0" of Step S108), the selector 226 outputs the comparison result "0" as the feedback signal to the load control unit 227 (Step S109).

If the received comparison result is "1" ("1" of Step S108), the selector 226 outputs the feedback control signal received from the system controller 221 as the feedback signal to the load control unit 227 (Step S111).

The load control unit 227 receives the feedback signal from the selector 226. If the received feedback signal is "0" ("0" of Step S112), the load control unit 227 instructs the CPU 206 to normally execute the application (Step S114).

If the received feedback signal is "1" ("1" of Step S112), the load control unit 227 instructs the CPU 206 to save the power consumption based on the current execution state of the CPU 206 and the control information table 240 (Step S116).

1.3 Summary

As described above, the battery control unit 220 of the battery-driven device of the present embodiment estimates whether the battery is in the early stage of use or not by means of the comparison between the voltage V of the battery 209 and the voltage threshold Vth. If the battery is estimated to be in the early stage of use, that is V≧Vth, the battery control unit 220 then makes judgment whether the battery 209 is in the early stage of use or not based on the stability voltage table 230 and so on. If the battery 209 is judged to be in the early stage of use, the battery control unit 220 outputs to the CPU 206 the instruction of the power-saving control corresponding to the currently executing application.

If the battery is judged not to be in the early stage of use, the battery control unit 220 outputs the instruction of normal execution of the application to the CPU 206. Accordingly, when the state of the battery changed from the early stage of use to the stability stage, it is possible to have the CPU 206 fully operate.

In this way, by conducting the power-saving control while the battery is in the early stage of use, the operating time of the battery can be prolonged.

1.4 Modifications of the Embodiment 1

(1) According to the embodiment above, it is the load control unit 227 that stores the control information corresponding to each application and the execution state information 246, and the feedback signal the load control unit 227 receives from the selector 226 only indicates the necessity of the power-saving control. However, if the system controller 221 also stores therein the control information corresponding to each application, and the battery 209 is in the early stage of use, the system controller may output the feedback control signal that also includes the instruction of the power-saving control.
(2) Also, the voltage threshold storage unit 224 may store therein the stability voltage table 230, and the system controller 221 may output to the voltage comparison unit 223 the identifier of the application that the CPU is executing, in synchronization with the voltmeter 208 measuring the voltage V of the battery 209.

In this case, the voltage comparison unit 223 reads out, from the voltage threshold storage unit 224, the stability voltage that corresponds to the identifier received from the system controller 221, and utilizes the read out stability voltage as the voltage threshold Vth mentioned above.

If this is the case, the selector 226 is unnecessary, and the voltage comparison unit 223 outputs the comparison result to the load control unit 227. If the received result is "0", the power-saving control is not required, and the load control unit 227 instructs the CPU 206 to normally execute the application. If the received result is "1", the load control unit 227 outputs to the CPU 206 the instruction of the power-saving control that corresponds to the executing application, as mentioned in the Embodiment 1.

With this structure, judgment of the early stage of use as explained above can be made by one comparison.

Furthermore in this modification, when the battery-driven device 200 is conducting an operation with very light load, for example, a folding mobile phone is in the standby mode with being folded, the state of the discharging battery is similar to the curve 106 in FIG. 12. This state is nearly ideal and the power-saving control is not likely required. Accordingly, in the above modification, when the CPU 206 is conducting an operation with very light load, the battery-driven device 200 outputs to the voltage comparison unit 223 the control signal showing power-saving control is unnecessary. Upon receiving the control signal, the voltage comparison unit 223 unconditionally outputs the comparison result "0" to the load control unit 227.

2. Embodiment 2

A battery-driven device pertaining to the embodiment 2 of the present invention is described in detail below with reference to the drawings. The descriptions that overlap with the embodiment 1 are omitted, and the characteristic part of the embodiment 2 is discussed in detail below.

2.1 Outline of Battery-Driven Device

In the same way as the embodiment 1, the battery-driven device of the embodiment 2 judges whether the battery is in the early stage of use and operates to control the power consumption. The battery-driven device of the embodiment 2 also addresses the voltage drop occurring when the battery enters the termination stage due to continuous use.

2.2 Battery Control Unit 260

The battery-driven device of the embodiment 2 is equipped with a battery control unit 260 instead of the battery control unit 220.

Figure 6:
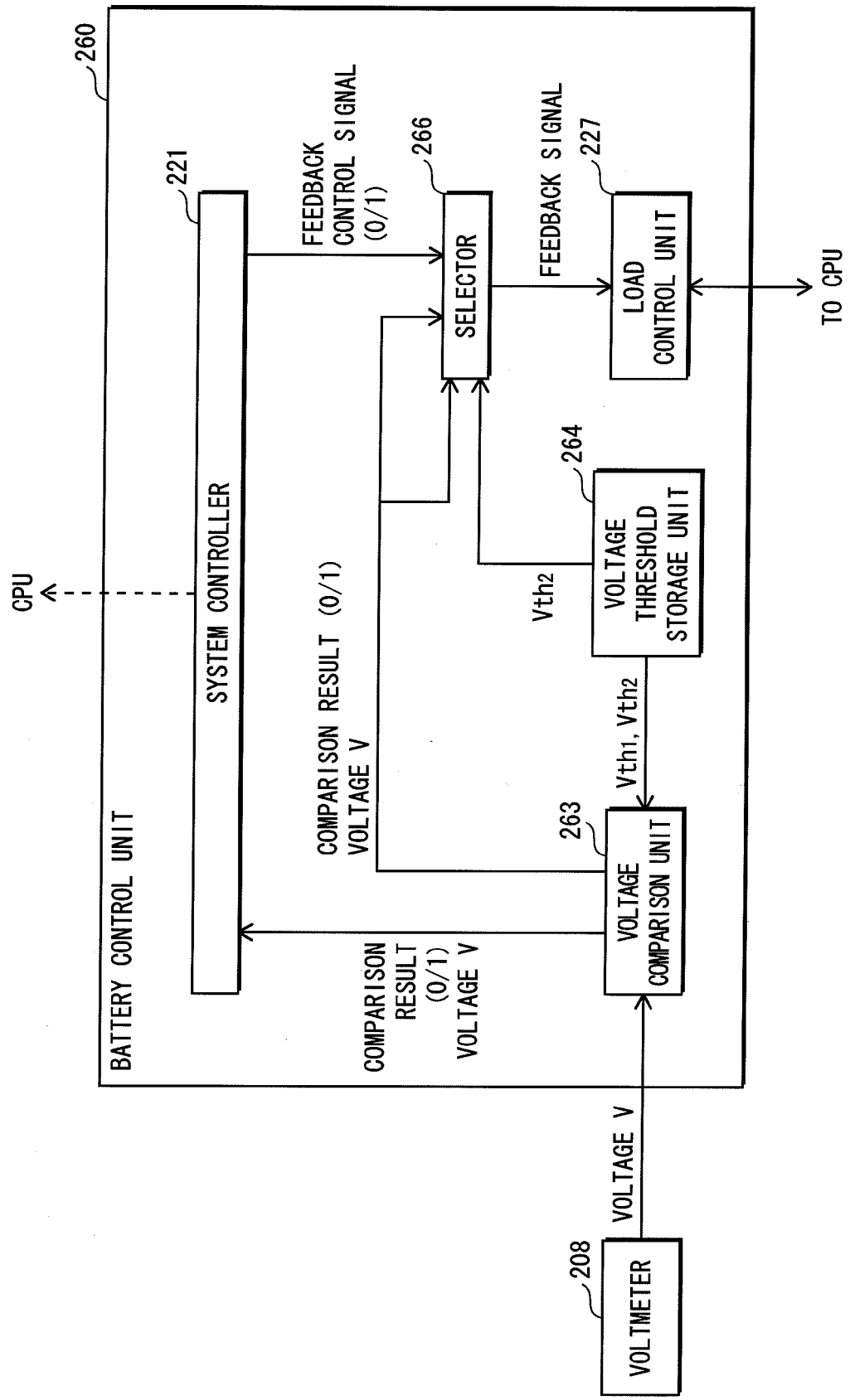
FIG. 6 is a diagram showing the structure of a battery control unit 260 that is the characteristic component of the embodiment 2.

FIG. 6 is a diagram showing the structure of the battery control unit 260. The components that are the same as those described in the battery control unit 220 are given the same referential number. As FIG. 6 indicates, the battery control unit 260 includes the system controller 221, a voltage comparison unit 263, a voltage threshold storage unit 264, a selector 266 and the load control unit 227.

The descriptions about the same structure as the embodiment 1 are omitted, and the characteristic part of the embodiment 2 is described below.

(1) Voltage Threshold Storage Unit 264

The voltage threshold storage unit 264 stores therein a first voltage threshold Vth1 and a second voltage threshold Vth2.

The first voltage threshold Vth1 is identical to Vth described in the embodiment 1.

The second voltage threshold Vth2 represents a voltage at a point where the sharp voltage drop starts while the present battery-driven device is continuously used under the heavy load condition. One example of the second voltage threshold Vth2 is the voltage 113 in FIG. 12. In the same way as the first voltage threshold, the second voltage threshold also varies depending on an application the CPU 206 is executing (that is, the load on the battery 209). By way of example, the second voltage threshold is defined as the voltage at the inflection point while the CPU 206 is executing the application with the heaviest load. From the inflection point the battery 209 enters the termination stage.

Note that the above definition of the second voltage threshold Vth2 is only an example. Alternatively, the voltage at the inflection point, at which the battery 209 enters the termination stage, may be measured for each of the applications during the execution thereof, and the average of the measured voltages may be used as the second voltage threshold Vth2.

(2) Voltage Comparison Unit 263

The voltage comparison unit 263 periodically receives the voltage V of the battery 209 from the voltmeter 208. Upon receiving the voltage V, the voltage comparison unit 263 reads out the first voltage threshold Vth1 and the second voltage threshold Vth2 from the voltage threshold storage unit 264. The voltage comparison unit 263 then compares the received voltage V with the read out first voltage threshold Vth1 and the second voltage threshold Vth2.

If the comparison result is $V \geq Vth1$ or $V < Vth2$, the voltage comparison unit 263 generates "1" as the comparison result. $V \geq Vth1$ indicates the battery is estimated to be in the early stage of use as described in the embodiment 1. $V < Vth2$ indicates the battery 209 is likely in the termination stage.

If the comparison result shows $Vth1 > V \geq Vth2$, the voltage comparison unit 263 generates "0" as the comparison result. $Vth1 > V \geq Vth2$ indicates the battery 209 is likely in the stability stage.

Subsequently, the voltage comparison unit 263 outputs the generated result and the voltage V to the system controller 221 and to the selector 266.

(3) Selector 266

The selector 266 receives the voltage of the battery 209 and the comparison result ("1" or "0") from the voltage comparison unit 263 in the same manner as the selector 226 described in the embodiment 1.

Figure 7:
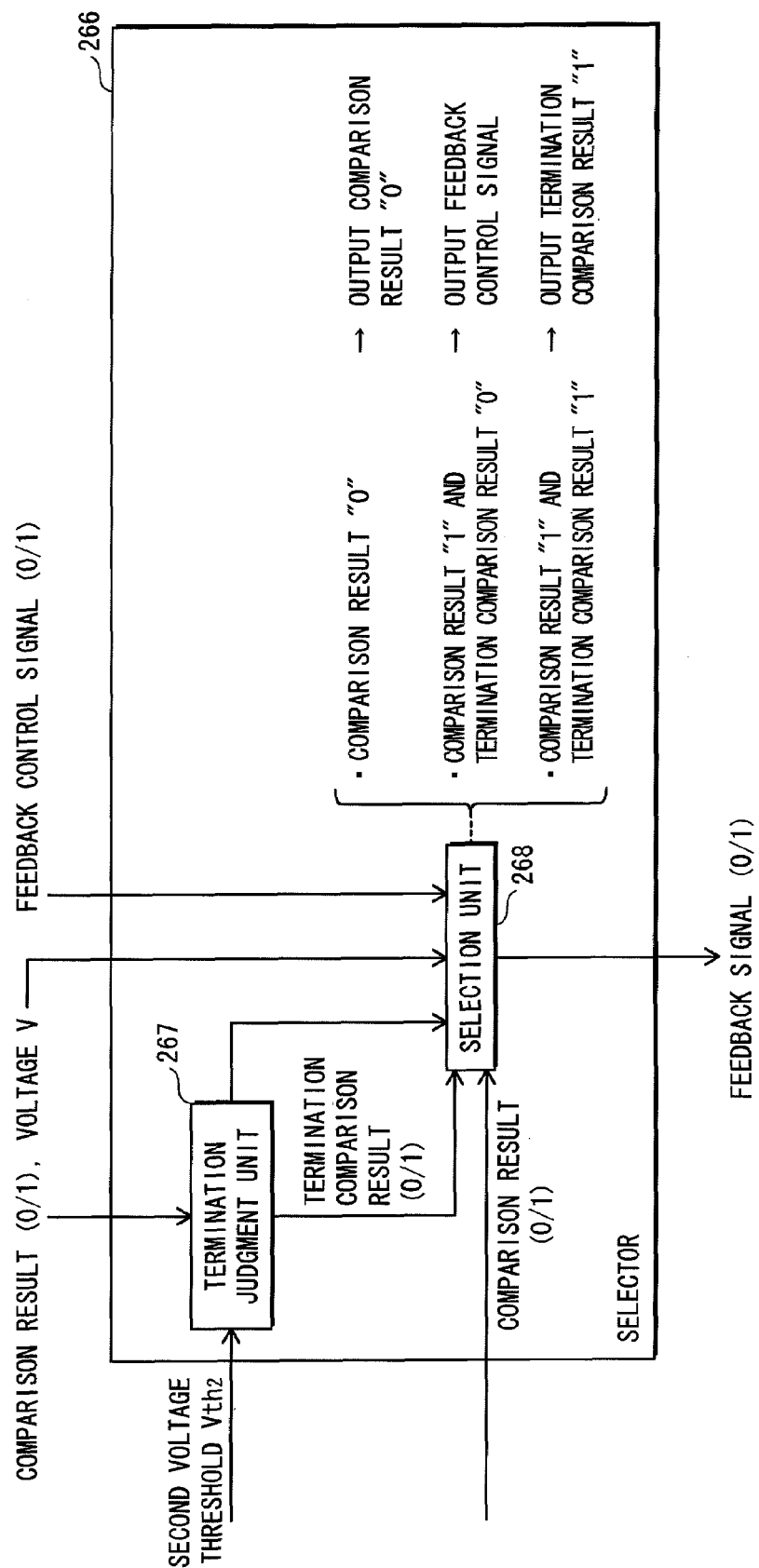
FIG. 7 is a block diagram showing the structure of a selector 266.

FIG. 7 is a block diagram showing the structure of the selector 266. As FIG. 7 indicates, the structure of the selector 266 includes a termination judgment unit 267 and a selection unit 268. The selector 266 also receives the feedback control signal from the system controller 221.

(3-1) Termination Judgment Unit 267

The termination judgment unit 267 is a functional unit that judges whether the battery 209 is in the termination stage or not. The judgment procedures are described below.

The termination judgment unit 267 receives the voltage V from the voltage comparison unit 263. Upon receiving the voltage V, the termination judgment unit 267 compares the received V with the second voltage threshold Vth2 stored in the voltage threshold storage unit 264.

If the result of the comparison is $V \geq Vth2$, the termination judgment unit 267 generates the termination comparison result "0", and outputs the result to the selection unit 268. $V \geq Vth2$ indicates the battery 209 is not likely in the termination stage yet.

If the result of the comparison is $V < Vth2$, the termination judgment unit 267 generates the termination comparison result "1", and outputs the result to the selection unit 268. $V < Vth2$ indicates the battery 209 is likely in the termination stage.

(3-2) Selection Unit 268

The selection unit 268 is a functional unit that selects one signal from among three signals which are the signal outputted from the system controller 221, the signal outputted from the voltage comparison unit 263 and the signal outputted from the termination judgment unit 267, based on the comparison result from the voltage comparison unit 263 and the termination comparison result from the termination judgment unit 267, and outputs the selected signal to the load control unit 227. The selection procedures are described below.

The selection unit 268 receives the comparison result and the voltage V from the voltage comparison unit 263. The selection unit 268 also receives the termination comparison result from the termination judgment unit 267. Furthermore, the selection unit 268 receives the feedback control signal from the system controller 221.

If the received comparison result is "0", the selection unit 268 unconditionally outputs the received comparison result "0" as the feedback signal to the load control unit 227.

If the comparison result is "1" and the received termination comparison result is "0", the selection unit 268 outputs the feedback control signal received from the system controller 221 as the feedback signal to the load control unit 227.

If the received comparison result is "1" and the received termination comparison result is also "1", the selection unit 268 outputs the termination comparison result "1" as the feedback signal to the load control unit 227.

2.3 Operations of the Battery Control Unit

Figure 8:
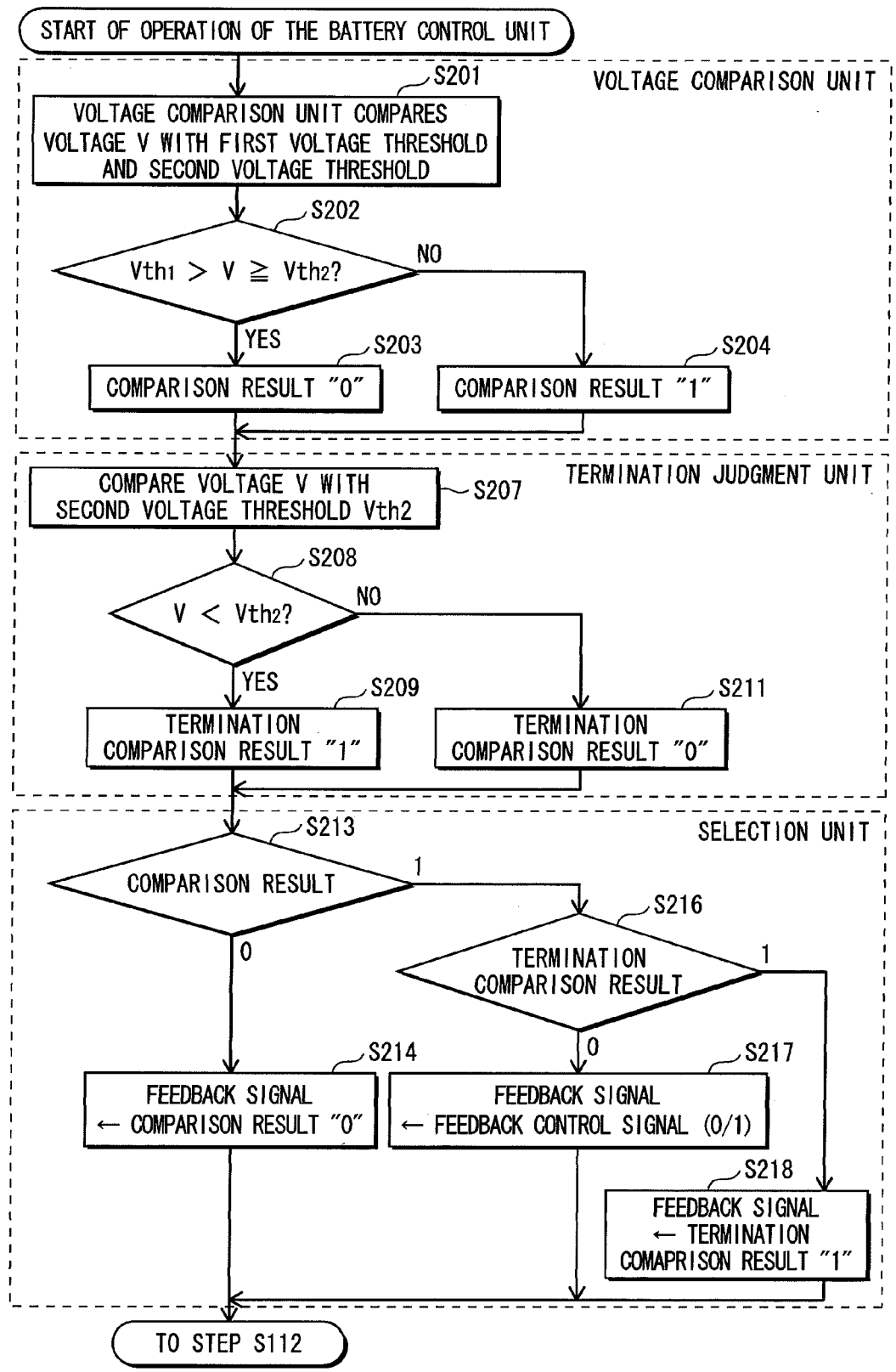
FIG. 8 is a flow chart showing operations of the battery control unit 260.

FIG. 8. is a flow chart showing the operations of the battery control unit 260 which is the characteristic part of the embodiment 2. The operations of the battery control unit 260 are described below with reference to FIG. 8.

The voltage comparison unit 263 compares the voltage V measured by the voltmeter 208 with the first voltage threshold and the second voltage threshold stored in the voltage threshold storage unit 264 (step S201).

If the result of the comparison shows $Vth > V \geq Vth2$ (YES of step S202), the voltage comparison unit 263 generates the comparison result "0", and outputs the result "0" and the voltage V to the system controller 221 and to the selector 266 (step S203).

If the result of the comparison shows $V \geq Vth1$ or $Vth2 > V$ (NO of step S202), the voltage comparison unit 263 generates the comparison result "1", and outputs the result "1" and the voltage V to the system controller 221 and to the selector 266 (step S204).

The termination judgment unit 267 included in the selector 266 compares the voltage V received from the voltage comparison unit 263 with the second voltage threshold Vth2 stored in the voltage threshold storage unit 264 (step S207).

If the result of the comparison shows $V < Vth2$ (YES of step S208), the termination judgment unit 267 generates the termination comparison result "1", and outputs the result "1" to the selection unit 268 (step S209).

If the result of the comparison shows $V \geq Vth2$, (NO of step S208), the termination judgment unit 267 generates the termination comparison result "0", and outputs the result "0" to the selection unit 268 (step S211).

The selection unit 268 included in the selector 266 receives the comparison result from the voltage comparison unit 263, feedback control signal from the system controller 221 and the termination comparison result from the termination judgment unit 267.

If the received comparison result is "0" ("0" of step S213), the selection unit 268 outputs the received comparison result as the feedback signal to the load control unit 227 (step S214).

If the received comparison result is "1" ("1" of step S213) and the termination comparison result is "0" ("0" of step S216), the selection unit 268 outputs to the load control unit 227 the feedback control signal received from the system controller 221 as the feedback signal (step S217).

If the received comparison result is "1" ("1" of step S213) and the termination comparison result is "1" ("1" of step 216), the selection unit 263 outputs to the load control unit 227 the received termination comparison result "1" as the feedback signal (step S218).

Since the operations after the feedback signal is outputted are the same as the operations after the step S112 described in the embodiment 1, their explanations are omitted here.

2.4 Summary

As described above, the battery control unit 260 included in the battery-driven device pertaining to the embodiment 2 not only detects that the battery is in the early stage of use, but also detects that the battery is in the termination stage due to continuous use, and operates to reduce the load on the battery. Accordingly, the battery can be used for a prolonged period of time.

3. Embodiment 3

A battery-driven device pertaining to the embodiment 3 of the present invention is described below with reference to the drawings. The components that overlap with the embodiment 1 and 2 are given the same referential numbers, and their descriptions are omitted.

3.1 Outline of a Battery-Driven Device 400

Figure 9:
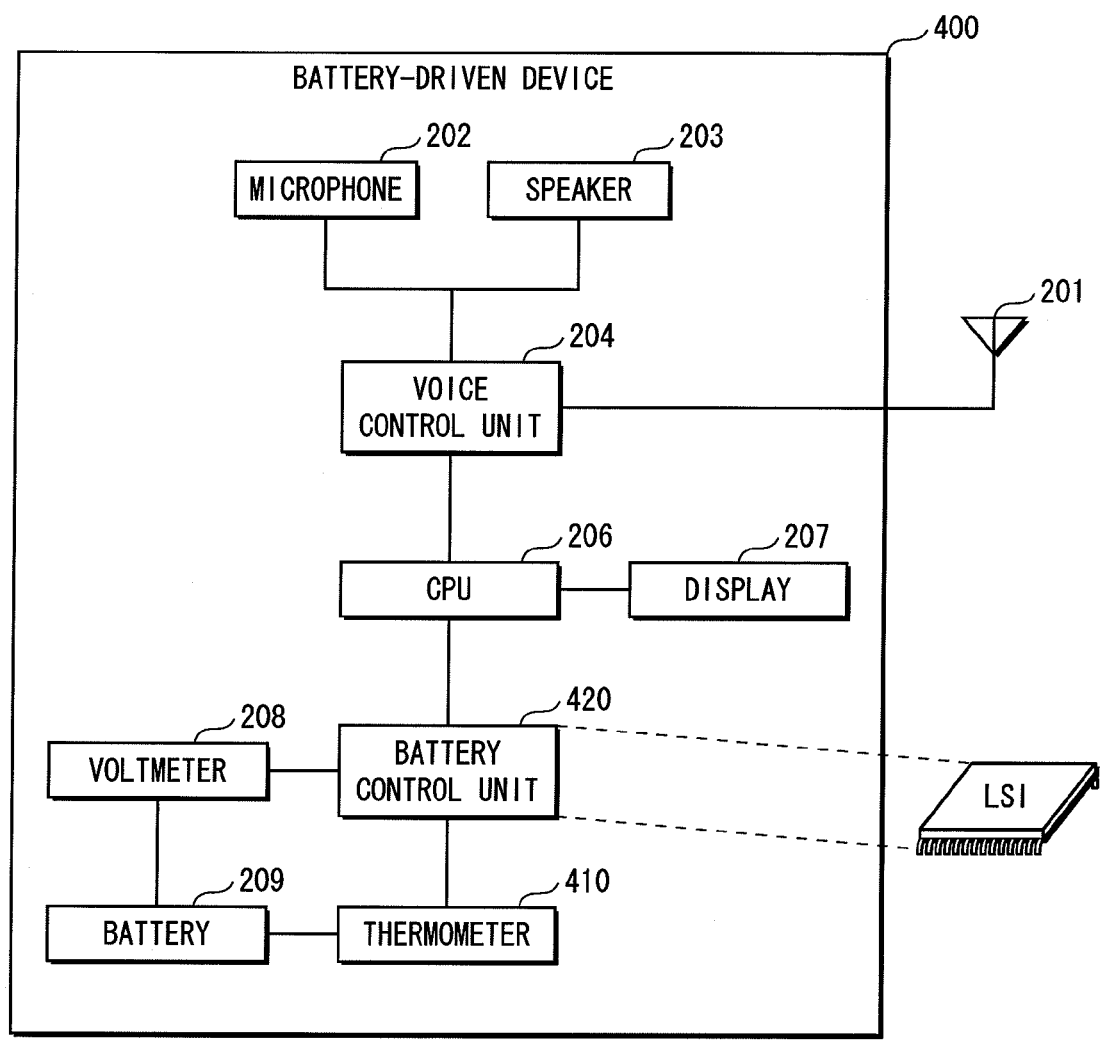
FIG. 9 is a diagram showing the structure of a battery-driven device 400 pertaining to the embodiment 3 and data flow among components thereof.

FIG. 9 is a diagram showing the structure of a battery-driven device 400 pertaining to the embodiment 3. As indicated in FIG. 9, the battery-driven device 400 is in concrete terms a mobile phone that includes a microphone, a speaker, and so on.

The battery-driven device 400 is equipped with a thermometer 410 that measures the temperature of the battery 209, and in the case where the temperature is lower than the prescribed threshold, the battery-driven device 400 operates to reduce the load on the battery.

3.2 Structure of a battery control unit 420

Figure 10:
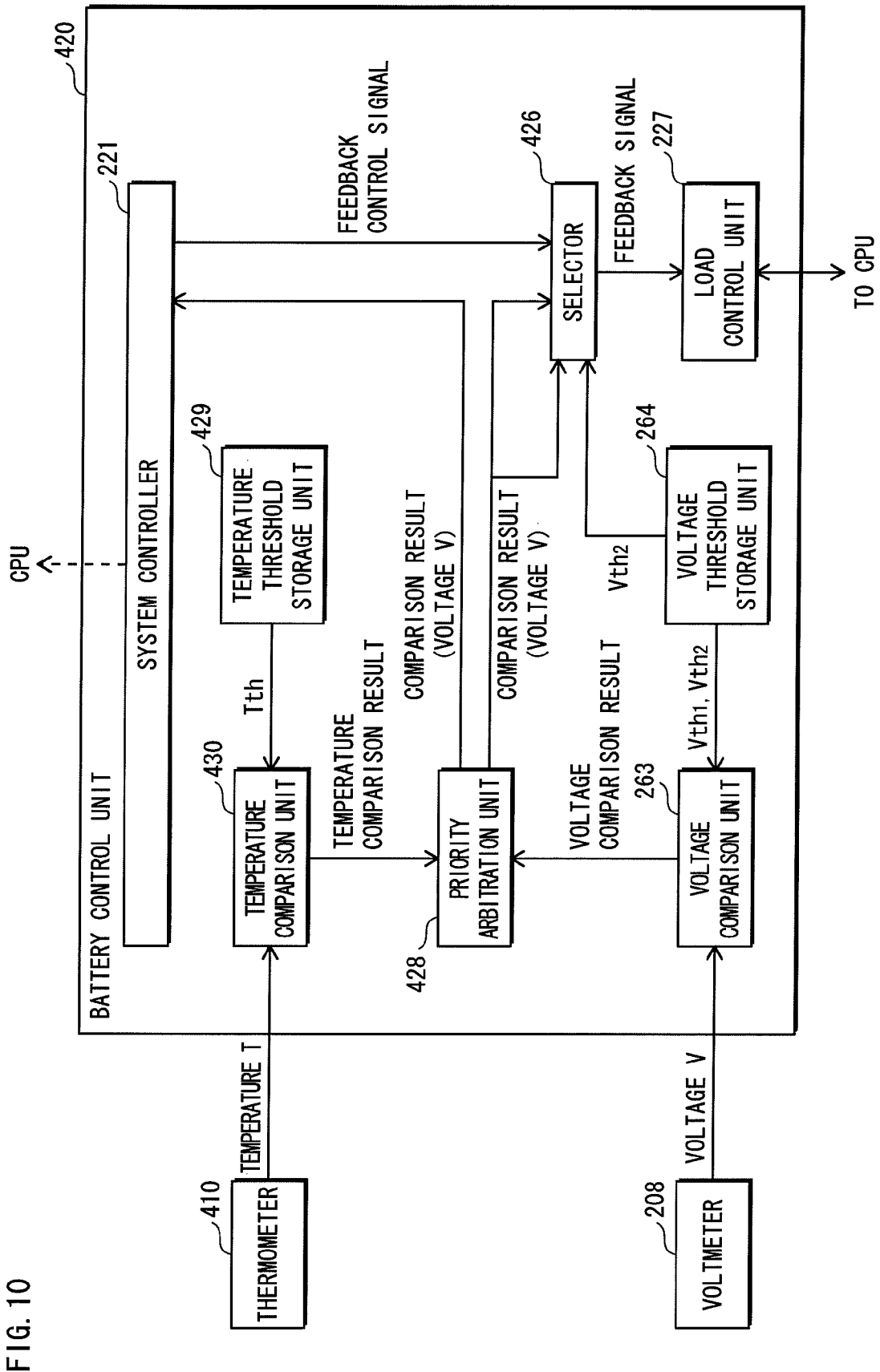
FIG. 10 is a diagram showing the structure of a battery control unit 420 that is the characteristic component of the embodiment 3.

FIG. 10 is a diagram showing the structure of a battery control unit 420, the thermometer 410 and a voltmeter 208, which are the characteristic components of the battery-driven device 400 pertaining to the embodiment 3.

As indicated in FIG. 10, the battery control unit 420 includes a system controller 221, a temperature threshold storage unit 429, a temperature comparison unit 430, a priority arbitration unit 428, a voltage comparison unit 263, a voltage threshold storage unit 264, a selector 426 and a load control unit 227. These components are formed on a single LSI as FIG. 6 indicates.

The descriptions are omitted regarding the system controller 221, the voltage comparison unit 263, the voltage threshold storage unit 264 and the load control unit 227 because these are the same as those described in the above embodiment 1 and embodiment 2.

(1) Thermometer 410

The thermometer 410 periodically measures current temperature of the battery 209, and outputs the measured temperature T to the temperature comparison unit 430.

(2) Temperature Threshold Storage Unit 429

The temperature threshold storage unit 429 is realized by a ROM or other type of nonvolatile recording medium such as a flash memory, and stores therein a temperature threshold Tth.

The temperature threshold Tth is the temperature that makes the discharge rate characteristic of the battery 209 poor, and is established by a manufacturer of the battery-driven device 400.

(3) Temperature Comparison Unit 430

The temperature comparison unit 430 periodically receives the temperature T from the thermometer 410. Upon receiving the temperature T, the temperature comparison unit 430 reads out the temperature threshold Tth from the temperature threshold storage unit 429, and compares the read out Tth with the received temperature T.

If the result of the comparison indicates $T \geq Tth$, the temperature comparison unit 430 generates a temperature comparison result "0". If the result of the comparison indicates $T<Tth$, the temperature comparison unit 430 generates a temperature comparison result "1".

Subsequently, the temperature comparison unit 430 outputs the generated temperature comparison result to the priority arbitration unit 428.

(4) Priority Arbitration Unit 428

The priority arbitration unit 428 receives the temperature comparison result from the temperature comparison unit 430, and also receives the voltage comparison result and the voltage V from the voltage comparison unit 263.

As described above, the temperature comparison result is 1-bit data of "1" or "0", and "1" indicates that the current temperature T is lower than the temperature threshold and "0" indicates the current temperature T is equal to or more than the temperature threshold Tth.

The voltage comparison result is identical to "the comparison result" generated by the voltage comparison unit in the embodiment 2, and "1" indicates that the current voltage V of the battery 209 is either $V \geq Vth1$ or $V<Vth2$, and "0" indicates $Vth1>V \geq Vth2$.

If the received temperature comparison result is "1", the priority arbitration unit 428 outputs the received temperature comparison result "1" to the selector 426 as a comparison result, regardless of the voltage comparison result.

If the received temperature comparison result is "0", the priority arbitration unit 428 outputs the received voltage comparison result as the comparison result to the system controller 221 and to the selector 426. Subsequently, the priority arbitration unit 428 outputs the voltage V received from the voltage comparison unit 263 to the system controller 221 and to the selector 426.

The "comparison result" outputted from the priority arbitration unit 428 is 1-bit data of "1" or "0", in the same way as the embodiment 1 and 2.

(5) Selector 426

The selector 426 includes a termination judgment unit and a selection unit as is the case with the selector 266 described in the embodiment 2 with reference to FIG. 7. FIG. 7 is used here again to describe the selector 426 in detail.

(5-1) Termination Judgment Unit

The termination judgment unit receives from the priority arbitration unit 428 either the comparison result only or the comparison result and the voltage V.

In the latter case, the termination judgment unit compares the received voltage V with the second voltage threshold Vth2 and outputs the termination comparison result, in the same way as the termination judgment unit 267 operates in the embodiment 2.

In the former case, the termination judgment unit unconditionally outputs the termination comparison result "1" to the selection unit.

Note that the descriptions about the structure and the operations of the selection unit are omitted here because they are identical to the selection unit 268 described in the embodiment 2.

3.3 Operations of the Battery Control unit 420

Figure 11:
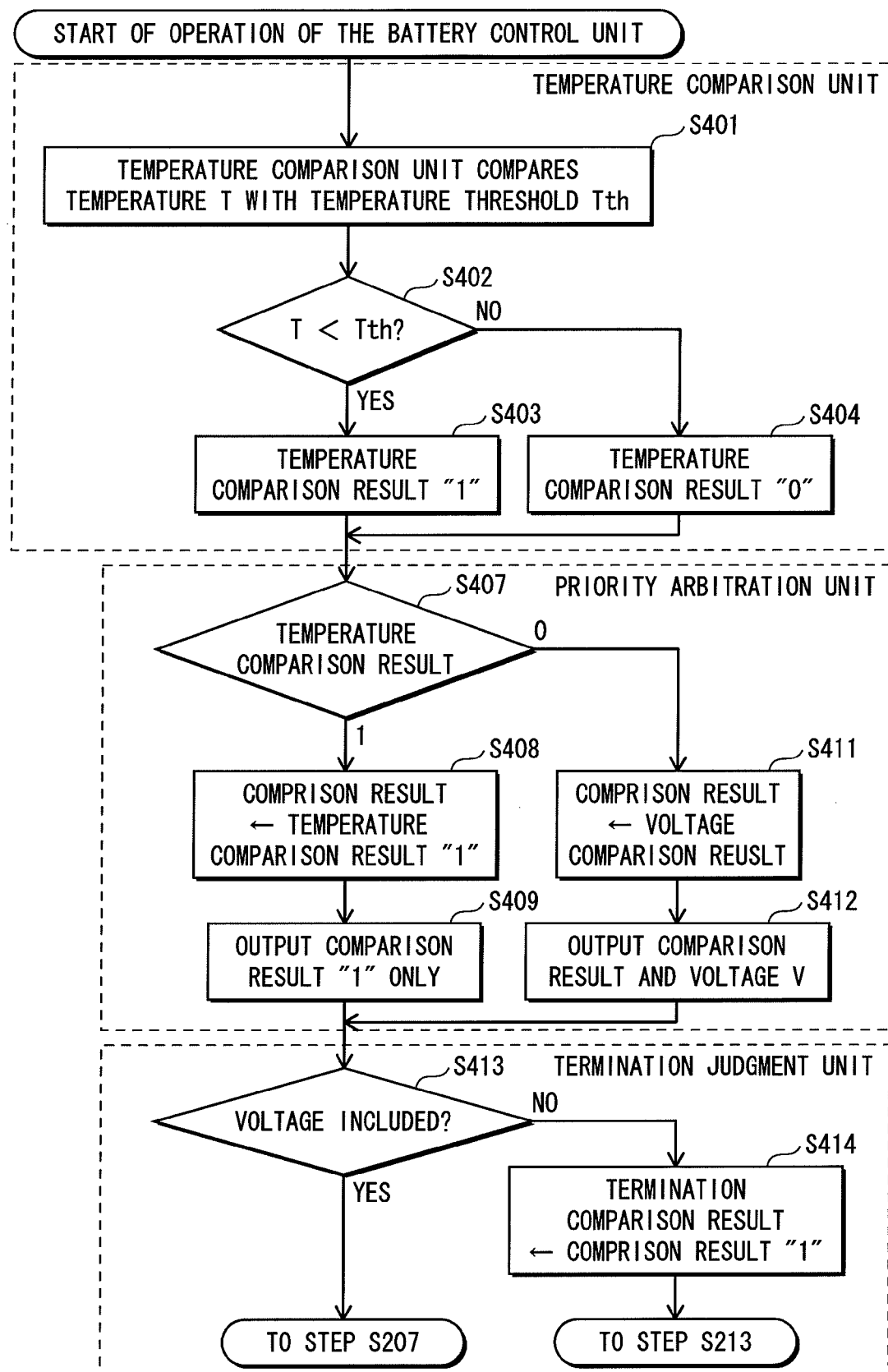
FIG. 11 is a flowchart showing operations of the battery control unit 420.

FIG. 11 is a flow chart showing the operations of the battery control unit 420 that is the characteristic part of the embodiment 3. The operations of the battery control unit 420 are described below with reference to FIG. 11.

The temperature comparison unit 430 compares the measured temperature T with the temperature threshold Tth stored in the temperature threshold storage unit 429 (step S401).

If the result of the comparison indicates T<Tth (YES of step S402), the temperature comparison unit 430 outputs the temperature comparison result "1" to the priority arbitration unit 428 (step S403). If the result indicates T≧Tth (NO of step S402), the temperature comparison unit 430 outputs the temperature comparison result "0" to the priority arbitration unit 428 (step S404).

Although not illustrated in FIG. 11, the voltage comparison unit 263 generates the voltage comparison result, and outputs the voltage comparison result and the voltage V.

The priority arbitration unit 428 receives the temperature comparison result from the temperature comparison unit 430, and also receives the voltage comparison result and the voltage V from the voltage comparison unit 263.

If the received temperature comparison result is "1" ("1" of step S407), the priority arbitration unit 428 regards the received temperature comparison result "1" as the comparison result (step S408) and outputs the comparison result to the selector 426 and to the system controller 221 (step S409).

If the received temperature comparison result is "0" ("0" of step S407), the priority arbitration unit 428 regards the voltage comparison result as the comparison result, and outputs the comparison result to the system controller 221 and to the selector 426. Together with the comparison result, the priority arbitration unit 428 outputs the voltage V (step S411 to S412).

The termination judgment unit included in the selector 426 receives from the priority arbitration unit 428 either the comparison result and the voltage V or the comparison result only. If the voltage V is included in the received signal (YES of step S413), the operations to follow are identical to the operations after step S207 in the embodiment 2. Accordingly, the descriptions are omitted here.

If the voltage V is not included in the received signal (NO of step S413), the termination judgment unit unconditionally generates the termination comparison result "1" and outputs the result to the selection unit (step S414). The operations after the termination comparison result is outputted are identical to the operations after step S213 described in the embodiment 2. Accordingly, the descriptions are omitted here.

3.4 Summary

As described above, the battery-driven device pertaining to the embodiment 3 is equipped with the thermometer that measures the temperature of the battery and the temperature comparison unit, and judges if the battery is in such a low-temperature state that makes the discharge rate characteristic of the battery poor. In the case where the battery is in the low-temperature state that makes the discharge rate characteristic of the battery poor, the priority arbitration unit notifies the selector and the system controller that it is necessary to reduce the load on the battery, based on the comparison result received from the temperature comparison unit. If the battery is not in the low-temperature state, the priority arbitration unit judges if the load reduction is needed or not by means of the voltage as is the case with the embodiment 1 and 2.

According to this structure, it is possible to operate the battery for a prolonged period of time even under the low temperature that makes the discharge rate characteristic of the battery poor.

5. Other Modifications

The present invention is described hereinbefore referring to the embodiments 1, 2 and 3 as the examples. However, obviously the present invention is not limited to these embodiments, and includes the following cases.

(1) Although the temperature threshold storage unit and the voltage threshold storage unit of the embodiments 1, 2 and 3, are described to be a nonvolatile recording medium and pre-store therein the temperature threshold and the voltage threshold, the present invention is not limited to this example.

For example, the temperature threshold storage unit and the voltage threshold storage unit may include a writable and erasable recording device, such as a flash memory, and a user may input and change the temperature threshold and the voltage threshold by operating an input part (not illustrated).

With this structure, when the battery is replaced with an another one, the battery-driven device of the present invention can utilize the temperature threshold and the voltage threshold that are suitable to the new battery to judge the necessity of power-saving operation.

(2) Although the battery control unit of the embodiment 1, 2 and 3 includes a single LSI, the present invention is not limited to this structure.

For example in FIG. 1, the components such as the CPU, the voltmeter, the voice control unit may be formed on a single chip, or each component may be formed on an individual integrated circuit.

(3) In the above embodiment 1, the voltage comparison unit compares the latest voltage V measured by the voltmeter with the voltage threshold Vth, and based on this comparison result, the selector, the system controller and the load control unit judge if the power-saving control is necessary. However, the present invention is not limited to this example.

For example, the voltage comparison unit 223 may temporarily store therein the periodically measured voltages, and also calculate a temporal variation (gradient) of the voltage.

In this case, if the temporal gradient of the voltage is equal to or lower than the prescribed threshold, the voltage comparison unit outputs "0", even if the voltage V is equal to or more than the voltage threshold Vth.

With this structure, it is possible to precisely detect if the voltage of the battery. is still declining sharply or already stabilized.

(4) The above battery-driven device may further be equipped with an ammeter. If this is the case, the battery-driven device may utilize the voltage V and an electric current A to precisely calculate the relationship between the discharged electric amount and the voltage of the battery as is indicated in FIG. 12. The battery-driven device may then calculate the gradient of the voltage relative to the discharged electric amount, and based on the calculated gradient, the battery-driven device may estimate the battery state and judge the necessity of the power-saving control.

(5) In concrete terms, each device described above is a computer system that includes a microprocessor, a ROM, a RAM, a hard disc unit, a display unit, a keyboard, a mouse, and the like. The RAM, the ROM and the hard disc unit store therein a computer program. Each device achieves their functions by the microprocessor operating in accordance with the computer program. The computer program is composed of a plurality of instruction codes showing instructions with respect to a computer in order to have the predetermined function achieved.

(6) Apart or all of the components included in each device described above may include a single system LSI (Large Scale Integration circuit) The system LSI is a super-multifunctional LSI on which a plurality of components are manufactured integrated on a single chip, and in concrete terms it is a computer system that includes a microprocessor, a ROM, a RAM, and the like. The RAM stores therein a computer program. The system LSI achieves its function by the microprocessor operating in accordance with the computer program.

(7) Apart or all of the components included in each device described above may include a removable IC card or single module. The IC card or the module is a computer system that includes a microprocessor, a ROM, a RAM, and the like. The IC card or the module may include the above-mentioned super multifunctional LSI. The IC card or the module achieves its function by the microprocessor operating in accordance with the computer program. The IC card or the module may be temper-resistant.

(8) The present invention may be a method described above. The present invention may also be a computer program to realize the method by a computer, or may be a digital signal of the computer program.

The present invention may be a computer-readable recording medium such as a flexible disc, a hard disc, a CD-ROM, an MO, a DVD, a DVD-ROM, a DVD-RAM, a BD (Blu-ray Disc) and a semiconductor memory, that stores the computer program or the digital signal. The present invention may also be the computer program or the digital signal recorded on any of the aforementioned recording medium.

The present invention may be the computer program or the digital signal transmitted via a telecommunication line, a wireless or wire communication line, a network represented by an internet or a data broadcasting.

The present invention may also be a computer system that includes a microprocessor and a memory, and the memory stores therein the computer program, and the microprocessor operates in accordance with the computer program.

The program or the digital signal may be executed on another independent computer system by transferring the program or the digital signal stored in the recording medium, or by transferring the program or the digital signal via the network and the like.

(9) The battery control unit in the embodiments above may be structured as a device removable from the battery-driven device. The present invention includes the case where all of the functional blocks of the aforementioned device are realized as an integrated circuit, that is LSI. The present invention also includes the case where not all but a part of the functional blocks of the aforementioned device are realized as an LSI. These functional blocks may be realized separately on an individual chip, or all or a part of the blocks may be included on a single chip. Here, the LSI may be an IC, a system LSI, a super LSI or an ultra LSI depending on the degree of integration.

The LSI is not the only way to realize the integrated circuit but also a special-purpose circuit or a general-purpose processor may be used to realize the integrated circuit. Alternatively, the integration may be realized with use of a FPGA (Field Programmable Gate Array) that is programmable after manufacturing of the LSI, or a re-configurable processor that enables re-configuration of the connection and settings of the circuit cells in the LSI.

Furthermore, instead of the LSI, if any alternative technology of realizing integrated circuit appears due to advancement of semiconductor technology or derivative technology, obviously such technology may also be applied to realize the integration of the functional blocks. Application of biotechnology is one possibility.

(10) The present invention may be any combination of the embodiments and the modifications described above.

The present invention can be used commercially, repeatedly and consecutively in such an industry that manufactures and sells a variety of electric devices that are driven by a secondary battery, or an industry that provides various kinds of services through these devices.

The invention claimed is:

1. A battery-driven device that is driven by a chargeable battery, comprising:
   a storage unit operable to store therein one or more voltage thresholds in one-to-one association with one or more operations to be executed by the battery-driven device, each voltage threshold representing a voltage, immediately after a start of discharging of a battery that is fully charged, at which the voltage of the battery changes from a sharp voltage drop to a moderate voltage drop during execution of one of the operations associated therewith;
   a voltage measuring unit operable to measure a voltage of the battery during the execution of one of the operations;
   a specifying unit operable to specify the one of the operations being executed by the battery-driven device;
   an acquisition unit operable to acquire one of the voltage thresholds that corresponds to the specified operation from the storage unit;
   a voltage comparison unit operable to compare the acquired voltage threshold with the measured voltage; and
   a control unit operable to control power consumption of the battery to decrease during the execution of the specified operation if the measured voltage is equal to or more than the acquired voltage threshold.

2. The battery-driven device of claim 1, further comprising:
   a reception unit operable to receive the one or more voltage thresholds inputted by a user,
   wherein the storage unit stores therein the one or more voltage thresholds received by the reception unit.

3. The battery-driven device of claim 1, further comprising:
   a temperature threshold storage unit operable to store therein a prescribed temperature threshold;
   a temperature measuring unit operable to measure a temperature of the battery; and
   a temperature comparison unit operable to compare the temperature threshold with the measured temperature,
   wherein the control unit further decreases power consumption of the battery if a comparison result by the temperature comparison unit indicates the measured temperature is lower than the temperature threshold, regardless of a comparison result by the voltage comparison unit.

4. The battery-driven device of claim 1, wherein
   the storage unit further stores therein a termination voltage threshold that represents a voltage for which a voltage drop of the battery becomes sharp when the battery has been continuously used,
   the battery-driven device further comprises a termination judgment unit operable to compare the voltage measured by the voltage measuring unit with the termination voltage threshold, and
   the control unit decreases power consumption of the battery if the measured voltage is lower than the termination voltage threshold, regardless of a comparison result by the voltage comparison unit.

5. A load control method used in a battery-driven device that is driven by a chargeable battery, the battery-driven device including a storage unit operable to store therein one or more voltage thresholds in one-to-one association with one or more operations to be executed by the battery-driven device, each voltage threshold representing a voltage, immediately after a start of discharging of a battery that is fully charged, at which the voltage of the battery changes from a sharp voltage drop to a moderate voltage drop during execution of one of the operations associated therewith, the load control method comprising:

a voltage measuring step of measuring a voltage of the battery during the execution of one of the operations;

a specifying step of specifying the one of the operations being executed by the battery-driven device;

an acquisition step of acquiring one of the voltage thresholds that corresponds to the specified operation from the storage unit;

a voltage comparison step of comparing the acquired voltage threshold with the measured voltage; and a control step of controlling power consumption of the battery to decrease daring the execution of the specified operation if the measured voltage is equal to or more than the acquired voltage threshold.

6. A non-transitory computer-readable recording medium storing a load control program used in a battery-driven device that is driven by a chargeable battery, the battery-driven device including a storage unit operable to store therein one or more voltage thresholds in one-to-one association with one or more operations to be executed by the battery-driven device, each voltage threshold representing a voltage, immediately after a start of discharging of a battery that is fully charged, at which the voltage of a battery changes from a sharp voltage drop to a moderate voltage drop during execution of one of the operations associated therewith, the load control program comprising:

a voltage measuring step of measuring a voltage of the battery during the execution of one of the operations;

a specifying step of specifying the one of the operations being executed by the battery-driven device;

an acquisition step of acquiring one of the voltage thresholds that corresponds to the specified operation from the storage unit;

a voltage comparison step of comparing the acquired voltage threshold with the measured voltage; and a control step of controlling power consumption of the battery to decrease during the execution of the specified operation if the measured voltage is equal to or more than the acquired voltage threshold.

7. An integrated circuit used in a battery-driven device that is driven by a chargeable battery, the integrated circuit comprising:

a storage unit operable to store therein one or more voltage thresholds in one-to-one association with one or more operations to be executed by the battery-driven device, each voltage threshold representing a voltage, immediately after a start of discharging of a battery that is fully charged, at which the voltage of a battery changes from a sharp voltage drop to a moderate voltage drop during execution of one of the operations associated therewith;

a voltage measuring unit operable to measure a voltage of the battery during the execution of one of the operations;

a specifying unit operable to specify the one of the operations being executed by the battery-driven device;

an acquisition unit operable to acquire one of the voltage thresholds that corresponds to the specified operation from the storage unit;

a voltage comparison unit operable to compare the acquired voltage threshold with the measured voltage; and a control unit operable to control power consumption of the battery to decrease during the execution of the specified operation if the measured voltage is equal to or more than the acquired voltage threshold.

\* \* \* \* \*